(12) United States Patent
Johnson et al.

(10) Patent No.: US 12,734,377 B2
(45) Date of Patent: Sep. 15, 2026

(54) HARDHAT WITH AIR CONDUIT

(71) Applicant: 3M INNOVATIVE PROPERTIES COMPANY, St. Paul, MN (US)

(72) Inventors: Benjamin A. Johnson, Woodbury, MN (US); Garry J. Walker, Stockton-On-Tees (GB); David L. Ausen, Eagan, MN (US); Paul A. Martinson, Maplewood, MN (US); David J. Schmidt, Lake Elmo, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 19/350,477

(22) Filed: Oct. 6, 2025

(65) Prior Publication Data

US 2026/0027390 A1 Jan. 29, 2026

Related U.S. Application Data

(63) Continuation of application No. 18/852,628, filed as application No. PCT/IB2023/053194 on Mar. 30, 2023, now abandoned.

(60) Provisional application No. 63/326,637, filed on Apr. 1, 2022, provisional application No. 63/362,367, filed on Apr. 1, 2022, provisional application No. 63/326,629, filed on Apr. 1, 2022, provisional application No. 63/362,364, filed on Apr. 1, 2022.

(51) Int. Cl.

| | |
|---|---|
| ***A42B 3/28*** | (2006.01) |
| ***A62B 9/04*** | (2006.01) |
| ***A62B 17/04*** | (2006.01) |
| ***A62B 18/00*** | (2006.01) |
| ***A62B 18/04*** | (2006.01) |
| ***A62B 18/08*** | (2006.01) |
| ***F16L 11/11*** | (2006.01) |
| *A42B 1/008* | (2021.01) |

(52) U.S. Cl.

CPC ............ *A62B 18/003* (2013.01); *A42B 3/281* (2013.01); *A42B 3/283* (2013.01); *A42B 3/286* (2013.01); *A62B 9/04* (2013.01); *A62B 17/04* (2013.01); *A62B 18/006* (2013.01); *A62B 18/04* (2013.01); *A62B 18/08* (2013.01); *F16L 11/11* (2013.01)

(58) Field of Classification Search

CPC .......... A62B 18/006; A62B 9/04; A42B 3/281

See application file for complete search history.

(56) References Cited

U.S. PATENT DOCUMENTS 2,560,215 A * 7/1951 Christensen ......... A62B 18/003 128/200.28
3,822,698 A * 7/1974 Guy ..................... A62B 18/045 128/201.25
3,881,478 A * 5/1975 Rosendahl ............... A42B 3/24 128/200.28
3,911,914 A * 10/1975 Johansson ............. A62B 18/04 2/2.5

(Continued)

FOREIGN PATENT DOCUMENTS

WO WO-9806458 A1 * 2/1998 ............. A62B 18/04

*Primary Examiner* — Robert H Muromoto, Jr.

(74) *Attorney, Agent, or Firm* — Aleksander Medved

(57) ABSTRACT

A hardhat having an outer major surface, and an air conduit coupled to the outer major surface. The outer major surface of the hardhat and the air conduit form an air channel for a source of supplied air.

18 Claims, 11 Drawing Sheets

(56) References Cited

U.S. PATENT DOCUMENTS 4,052,984 A * 10/1977 Brockway ............. A62B 18/04 128/204.18
4,236,514 A * 12/1980 Moretti .................. A62B 17/04 2/205
D261,942 S * 11/1981 Sweet ...................... D24/110.2
4,411,264 A * 10/1983 Jacobson ............... A62B 17/04 128/201.15
4,752,974 A * 6/1988 Haino .................. A62B 18/045 128/201.24
4,815,458 A * 3/1989 Sing ......................... A62B 7/00 128/205.12
4,832,287 A * 5/1989 Werjefelt ............... B64D 11/00 280/732
5,561,862 A * 10/1996 Flores, Sr. ............ A42B 3/286 2/422
5,878,742 A * 3/1999 Figueredo ............ A62B 18/003 128/201.24
6,836,906 B2 * 1/2005 Holmes .................... A42B 3/28 2/6.1
7,036,502 B2 * 5/2006 Manne ................. A62B 18/003 128/200.27
7,197,774 B2 * 4/2007 Curran .................... A61F 9/068 128/201.25
7,823,586 B2 * 11/2010 Glazman .................. A61L 9/20 128/202.25
8,887,719 B2 * 11/2014 Billingsley ......... A61M 16/105 128/201.25
8,899,227 B2 * 12/2014 Billingsley ....... A61M 16/0003 128/201.25
9,358,409 B2 * 6/2016 Ausen .................. A62B 18/045
9,510,632 B2 * 12/2016 Perusse ................ A62B 18/003
9,744,328 B2 * 8/2017 Billingsley ......... A61M 16/107
9,744,329 B2 * 8/2017 Billingsley ....... A61M 16/0003
D803,486 S * 11/2017 Patel ........................... D29/122
D804,107 S * 11/2017 Patel ........................... D27/111
9,814,622 B2 * 11/2017 Sommers ............... A42B 3/225
9,861,142 B1 * 1/2018 Rebecchi .............. F04D 29/403
9,974,350 B2 * 5/2018 Perusse .................. A42B 3/145
9,999,546 B2 * 6/2018 Gardner ................. A42B 3/286
10,016,008 B2 * 7/2018 Sommers ............... A42B 3/085
10,653,197 B2 * 5/2020 Perusse ............... A61M 16/107
10,702,003 B2 * 7/2020 Patel ...................... A42B 3/225
10,702,721 B2 * 7/2020 Perusse ................ A62B 18/003
10,953,248 B2 * 3/2021 Yu ..................... A61M 16/1055
11,033,433 B2 * 6/2021 Sommers ................ A61F 9/064
11,058,586 B2 * 7/2021 Sommers ............... A42B 3/225
11,131,310 B1 * 9/2021 Emery ................... A42B 3/286
11,185,722 B2 * 11/2021 Sernfält ............... A62B 18/006
11,253,022 B2 * 2/2022 Frejd ...................... A42B 3/288
D986,510 S * 5/2023 Leschinsky .................. D29/108
11,744,914 B2 * 9/2023 Wyss ........................ F24F 9/00 250/435
11,779,075 B2 * 10/2023 Frejd ...................... A42B 3/042 2/15
11,812,816 B2 * 11/2023 Gardner .................... F41H 1/04
12,128,261 B2 * 10/2024 Leschinsky ............ A62B 18/08
2011/0240026 A1 * 10/2011 Ausen .................... A42B 3/286 128/205.12
2013/0014751 A1 * 1/2013 Ausen .................. A62B 18/045 128/201.24
2013/0139818 A1 * 6/2013 Billingsley .......... B01D 46/103 128/205.12
2013/0152919 A1 * 6/2013 Billingsley ......... A61M 16/107 128/201.25
2015/0296917 A1 * 10/2015 Perusse .................. A42B 3/286 2/15
2020/0275726 A1 * 9/2020 Frejd ...................... A42B 3/286
2021/0098678 A1 * 4/2021 Palaniswamy ....... H10N 10/856
2022/0087356 A1 * 3/2022 Asnis ................. A41D 13/1218
2023/0147583 A1 * 5/2023 Sing ..................... A62B 18/006 128/201.25

* cited by examiner 14
18
20
16
40
28
12
21
22
23
25
26
24

14
18
12
16
26
21
22
42
24
23

HARDHAT WITH AIR CONDUIT

BACKGROUND

Generally, this disclosure relates to respirators that are worn on a user's head to provide breathable air for the user.

Respirators are well known and have many uses. For example, respirators may be used to allow the user to breathe safely in a contaminated atmosphere, such as a smoke-filled atmosphere, a fire or a dust laden atmosphere, or in a mine or at high altitudes where sufficient breathable air is otherwise unavailable, or in a toxic atmosphere, or in a laboratory, heavy industry, paint spray or chemical applications, or in a medical or pharmaceutical environment. Respirators may also be worn where it is desired to protect the user from contaminating the surrounding atmosphere, such as when working in a clean room used to manufacture silicone chips.

Some respirators have a helmet that is intended to provide some protection against impacts when working in a dangerous environment or when the user is at risk of being struck by falling or thrown debris such as in a mine, an industrial setting or on a construction site. Another type of respirator employs a hood when head protection from impact is not believed to be required such as, for example, when working in a laboratory or a clean room.

A respirator hood is usually made of a soft, flexible material suitable for the environment in which the hood is to be worn, and an apron or skirt may be provided at a lower end of the hood to extend over the shoulder region of the user. Hoods of this type are commonly used with a bodysuit to isolate the user from the environment in which the user is working. The apron or skirt often serves as an interface with the bodysuit to shield the user from ambient atmospheric conditions. Another form of hood is sometimes referred to as a head cover, and does not cover a user's entire head, but only extends above the ears of the user, and extends down about the chin of the user in front of the user's ears. The hood has a transparent region at the front, commonly referred to as a visor, through which the user can see. The visor may be an integral part of the hood or detachable so that it can be removed and replaced if damaged.

A respirator helmet is usually made from a hard, inflexible material suitable for the environment in which the helmet is to be worn. For example, such materials may include metallic materials such as steel or hard polymers. A respirator helmet typically will extend at least over the top of the user's head, and may have a brim around all sides thereof, or a bill extending forwardly therefrom, thereby providing additional protection over the user's facial area. In addition, such a helmet may also include protective sides extending downwardly from along the rear and sides of the user's head. Such sides may be formed from an inflexible material or may be formed from a flexible material. A respirator helmet has a visor disposed thereon that permits the user to see outside of the respirator. The visor may be transparent. However, in some instance, such as for welding, the visor may be tinted or it may include a filter, such as an auto darkening fitter (ADF). The visor may be an integral part of the respirator helmet or detachable so that it can be removed and replaced if damaged.

A respirator helmet is intended to provide a zone of breathable air space for a user. As such, the helmet is also typically sealed about the user's head and/or neck area. At least one air supply provides breathable air to the interior of the respirator helmet. The air supply pipe may be connected to a remote air source separate from the user, but for many applications, the air supply pipe is connected to a portable air source carried by the user, commonly on the user's back or carried on a belt. In one form, a portable air supply comprises a turbo unit, including a fan driven by a motor powered by a battery and a filter. The portable air supply is intended to provide a breathable air supply to the user for a predetermined period of time.

SUMMARY

A device to be used for respiratory protection when a user is additionally wearing a hardhat. The device includes an air conduit which sits on the outer major surface of a hardhat, the conduit receives supplied air in an air inlet proximate an area associated with the back of the hardhat, and delivers it directionally toward an air outlet in an area closer to the front of the hardhat. The conduit comprises a wall, and defines an air channel in conjunction with the outer major surface of the hardhat, the air channel providing fluidic communication between the air inlet and the air outlet. The air conduit may comprise a plurality of sub-conduits, and is made of a light, thermoplastic material.

This Summary is provided to introduce a selection of concepts in a simplified form that are further described below in the Detailed Description. This Summary is not intended to identify key features or essential features of the claimed subject matter, is not intended to describe each disclosed embodiment or every implementation of the claimed subject matter, and is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure or system elements are referred to by like reference numerals throughout the several views.

Figure 1:
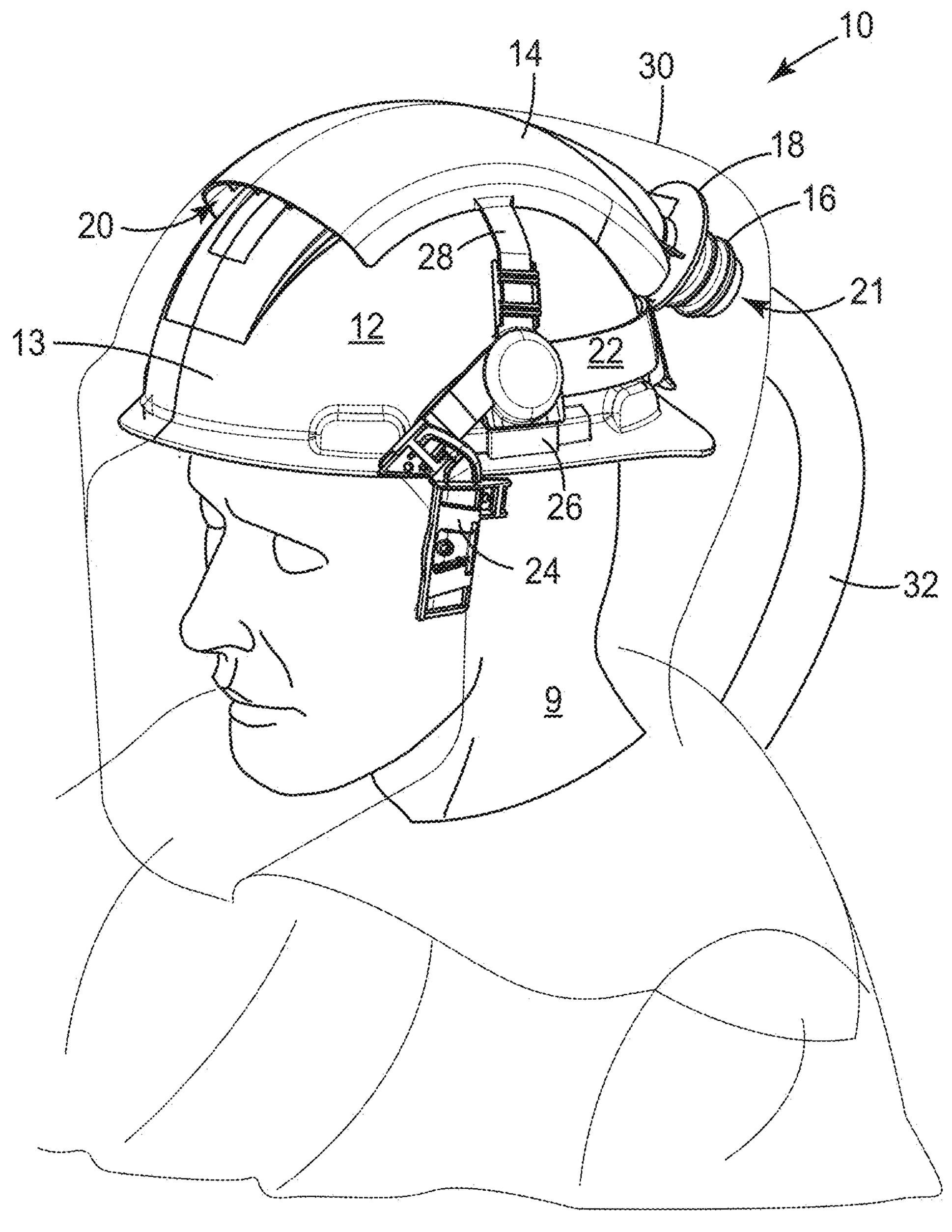
FIG. 1 is a view of a respirator assembly as worn by a user.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art which fall within the scope and spirit of the principles of this disclosure.

DETAILED DESCRIPTION

Workers in industrial settings may at times require both respiratory protection and head impact protection, as for example when they are in an area with airborne contaminants as well as head impact risks. Respiratory protection in such environments is often provided by a powered air purifying respirator (PAPR) which includes a fan and filter assembly worn on a worker's belt, providing filtered air to the inside of a soft, flexible hood that is worn over the head and upper shoulders of the worker, via a supply line. Such hood is typically made of a substantially air impermeable cloth or nonwoven material sewn to generally conform to the head and upper shoulder area of the worker. The hood typically includes an integrated viewing window made of a clear plastic, allowing the worker to see out of the hood. The PAPR provides a supply of filtered air, often times continuous, to the worker.

Head protection for such environments is typically specialized and costly and require helmets that both accommodate an air supply and define a breathable air zone.

Various embodiments provided herein describe a novel respirator assembly that combines a hooded PAPR with a standard hardhat, such standard hardhat being is relatively inexpensive and readily available at most work sites. In various embodiments, an assembly comprising ducting in the form of one or more conduits are sandwiched between an outer surface of the hard hat and an inner surface of a hood. The air conduit(s), in several embodiments, run(s) along an exterior portion of the hardhat to receive filtered air from a supply line proximate the back of the hardhat, then channel it generally toward a breathable air zone proximate a user's face, for respiration. In one embodiment, as will be seen, the breathable air zone is defined principally by the hood and its viewing window. The air conduits in some embodiments follows the contours of the hardhat. The assembly, in some embodiments, is detachably coupled to the hardhat via accessory ports that are standard on many hardhats.

Glossary

The terms set forth below will have the meanings as defined:

Hood means a shroud having a face piece that covers at least a face and head of the user but does not provide head impact protection.

Hardhat means a head covering designed to provide impact protection for a user's head per a regulatory standard, and is at least partially formed from a material that provides such impact protection.

Non-shape stable means a characteristic of a structure whereby that structure may assume a shape, but is not necessarily able, by itself, to retain that shape without additional support.

Shape stable means a characteristic of a structure whereby that structure has a defined shape and is able to retain that shape by itself, although it may be flexible.

Breathable air zone means the space around at least a user's nose and mouth from where air may be inhaled.

Manifold means an air flow plenum having an air inlet and having one or more discrete air conduits in communication with the air inlet, with each air conduit having at least one air outlet.

One embodiment of a respiratory assembly 10 is illustrated in FIG. 1. In this instance the assembly includes a hardhat 12 worn by user 9. Situated on the outer major surface 13 of hardhat 12 is an air conduit 14, which in this embodiment, comprises a wall that forms an air channel in conjunction with a portion of the outer major surface of the hardhat, that provides air from air inlet 21 to air outlet 20, directionally toward a breathable air zone proximate user 9's face. Air inlet 21 is coupled to an air supply, such as a fan assembly for a powered air purifying respirator (PAPR), via an air supply line 32 which couples to air inlet 21 via a male coupling port 16, which extends outside of the hood (fan assembly not shown in FIG. 1.) Coupling port may comprise one or more rib structures that circumscribe coupling port, and may include portions of a mechanism for removably coupling the coupling port to a source of supplied air, such as a bayonet-type attachment, a snap fit attachment, pin in a slot or cam-follower, or a simple screw thread interface. In some embodiments the rib structures are made of a lower durometer material than the coupling port, to act as a gasket and improve air sealing between the coupling port and a supply hose. In some embodiments the rib structures may be over molded onto the coupling port. The air inlet 21 and coupling mechanism are located proximate the back of the hardhat (that is, the area of the hardhat which when worn is proximate the back of the user's head); conduit 14 and the exterior surface of the hardhat form a channel that provides air from the air inlet located at the back of the hardhat toward the front of the hardhat and toward the breathable air zone of user 9.

Hood 30 envelopes the respirator assembly, hardhat, head and possibly further body areas of user 9 in a non-shape stable covering that separates the interior of the respirator assembly (which when worn by a user would include the aforementioned components), from the ambient environment of the user. Hood includes a viewing window made of a light transmissive material such as plastic and defines a breathable air zone for user 9. Hood is, in some embodiments, comprised of a non-shape stable woven or non-woven material. Preferably, the material is substantially air impermeable, and in use comfortably drapes over a wearer's hardhat, head and shoulder regions. Examples of such material include polypropylene or polyethylene-based fabric laminates, which usually include a nonwoven material and a barrier film which have been laminated together, usually with heat. Common industrial fabric brand names include those sold by DuPont under the Tyvek trade name and Kappler under the Zytron trade name. Hood 30 couples to hardhat 12 via first and second hood coupling assemblies (the one of the two being shown as hood coupling assembly 24), which extend downward from the hardhat's brim and sit proximate the temple regions of user's head. Additionally, in some embodiments, hood 30 includes an aperture (not shown in FIG. 1), which allows air inlet to extend outside of hood 30 and couple to air supply line 32. The aperture in some embodiments a biased aperture which is biased toward a closed position, as by the use of for example an elastic material or a rubber band, which when grips relatively securely around flange 18. In other embodiments, the aperture may not necessarily be biased toward closed, as the significant positive pressure environment provided by the supplied air within the hood overcomes the potentially loose grip of the hood around the extended air inlet.

Hood coupling assemblies (24) and the air conduit 14 detachably couple to the hardhat via adapter 22, which is removably coupled to hardhat 12 through hardhat accessory port 26. Air conduit 14 includes attachment element 28 to removably couple to adapter 22. Further attachment points and other means of fastening the hardhat, the air conduit, and the hood, such as adhesives, tapes, and other mechanical fasteners, are contemplated within the scope of this disclosure.

An air supply provided via a fan assembly through air supply line 32, and through the air channel defined by the outer major surface of the hardhat and air conduit 14 provides, in one embodiment, a continuous supply of filtered, breathable air and results in a positive air pressure environment in the user's breathable air zone.

Air conduit 14, or conduit 14, is in one embodiment, a shape stable structure preferably made of a light, sturdy thermoplastic material, (for example, suitable polymers such as nylon, polypropylene, low- or high-density polyethylene, acrylonitrile butadiene styrene, etc.). Conduit 14, in one embodiment, is formed via injection molding, 3D printing, or other known manufacturing techniques suitable for the material chosen. Conduit 14, in the embodiments shown in FIG. 1, has an elongated inverted "U" shape, or wall, that forms, in conjunction with the outer surface of the hardhat, an air channel that fluidically couples air inlet 21 to air outlet 20. Conduit 14 may comprise inner structures, such as ribs or posts, to add rigidity, durability, and strength to the conduit and to prevent collapse of the conduit. In some embodiments, rib structures assist in defining the air channel, and run from the air inlet toward the air outlet. Additional features/structures inside or outside conduit 14 and adapter 22 may include over molded soft thermoplastic elastomers (TPEs), thermoplastic urethanes (TPUs), or thermoplastic vulcanizates (TPVs). Conduit 14, while shown with respect to the embodiment in FIG. 1 as defining an air channel in conjunction with an outer surface of a hardhat (that is, the outer surface of the hardhat comprises the "$4^{th}$ wall" of the conduit), in other embodiments described herein, the conduit may be a self-contained conduit, that is, it does not rely on the outer surface of the hardhat to form a wall (for example see embodiments associated with FIGS. 10-11, 14-15, 16-17, and 18-19, which are all have self-contained conduits). Advantages of using the outer surface of the hardhat to define $4^{th}$ wall of the air channel may comprise lighter weight, reduced cost, and greater conformance of the conduit to various shapes of the hardhat. Additionally, fewer mechanical structures are generally preferred in the context of a hardhat, so as not to negate or interfere with regulatory ratings of the underlying hardhat.

Conduit 14, in some embodiments including the one shown in FIG. 1, has a shape that follows the geometric shape of at least part of the outer major surface of the hardhat, and the air outlet is located further away from the back of the hardhat than the air inlet. In preferred embodiments, the geometric shape of the hardhat directs supplied air toward the front of the hardhat and the user's breathable air zone. In embodiments associated with later figures (e.g., FIGS. 10-19), conduit 14 will be shown to be bifurcated into sub-conduits, which fork in a manifold area proximate the air inlet at the back of the hardhat and curve around the side regions, in some cases the temple regions, of the hardhat, to provide an air outlet aimed toward the front of the helmet and the user's breathable air zone.

Hardhat 12 is preferably a commercially available hardhat that meets a regulatory standard for head impact protection of a wearer. It is of a type that is often readily available at construction and industrial worksites. In Europe, such a hardhat is sometimes referred to as an Industrial Safety Helmet, and meet requirements contained in PPE Regulation (EU) 2106/425, and would thus be tested and approved in accordance with European Standard EN 397:2012+A1: 2012, "Industrial Safety Helmets." In the United States, hardhats would meet ANSI/ISEA Z89.1-2014(R2019), "American National Standard for Industrial Head Protection," and would be designated into subtype (Type I or II (based on level of protection from impacts to the top versus lateral areas of the head)) and Class (based on electrical insulation). Other regions or countries may have other standards. Canada's relevant standard is Z94.1-15 (reaffirmed 2020); Spain has UNE-EN 12941 (April 1999), for example. Referenced regulatory standards generally specify a minimum defined protected area, as well as test requirements for various hazards, such as impact, penetration, impact attenuation, electrical rating, flammability resistance, etc. The regulatory standards are updated from time to time.

Most commercially available hardhats include a pair of standard sized accessory ports 26 located on the lateral sides of the hardhat, proximate a wearer's temples. The accessory ports define two rectangular apertures which provide attachment points for the mechanical coupling of various accessories to the hardhat. Such accessories include, for example, face shields and earmuffs. The accessory port has an opening approximately 1" by ⅛" (1.54×0.3175 cm), and extends about 0.5" (1.27 cm) vertically. The area of the hardhat proximate the user's forehead, when worn, is the front of the hardhat; the area of the hardhat opposite the front is the back. The top of the hardhat is the area proximate the crown of the user's head. Temple regions laterally extend from the back of the hardhat to the front, below the crown. Hardhat 12 is, as worn by user 9 in FIG. 1, is in a reverse orientation, in that the portion of the hardhat having a more pronounced brim, is toward the back of the users' head. This is intentional and may be effected by reversing the suspension inside the hardhat, which is sometimes referred to as "reverse donning" in, for example, various regulatory standards. Hardhats which meet regulatory approval when reverse donned are typically certified in both a normal don, and a reverse don, and are marked with a reverse donning symbol indicating compatibility with the reverse orientation. In various embodiments described herein, it may be preferable to wear hardhat in this reverse orientation, as the less pronounced, less elongate brim portion is located proximate the user's forehead, allowing relatively better air flow from outlet 20 of conduit 14 toward the breathable air zone. While wearing the hardhat in reverse orientation is preferable in many embodiments described herein, it is still contemplated within the scope of this disclosure that the hardhat may be worn with the larger brim forward, that is, in normal orientation.

Hardhat 12 has an inner major surface proximate a suspension system that interfaces with a user's head, and an outer major surface opposite the inner major surface. Hardhat shell is typically formed of, for example, ultraviolet (UV)-stabilized acrylonitrile butadiene styrene (ABS) or high density polyethylene (HDPE) material, and assumes a helmet-like geometric shape, which generally follows the curvature of the top half of a user's head. A headband proximate the inner major surface may be made of high-density polyethylene, for example, and a sweatband may be comprised of leather or a polyvinyl chloride foam for instance. Other materials are also possible. In some embodiments, conduit 14 has a geometric shape that follows the outer major surface of the hardhat.

Figure 2:
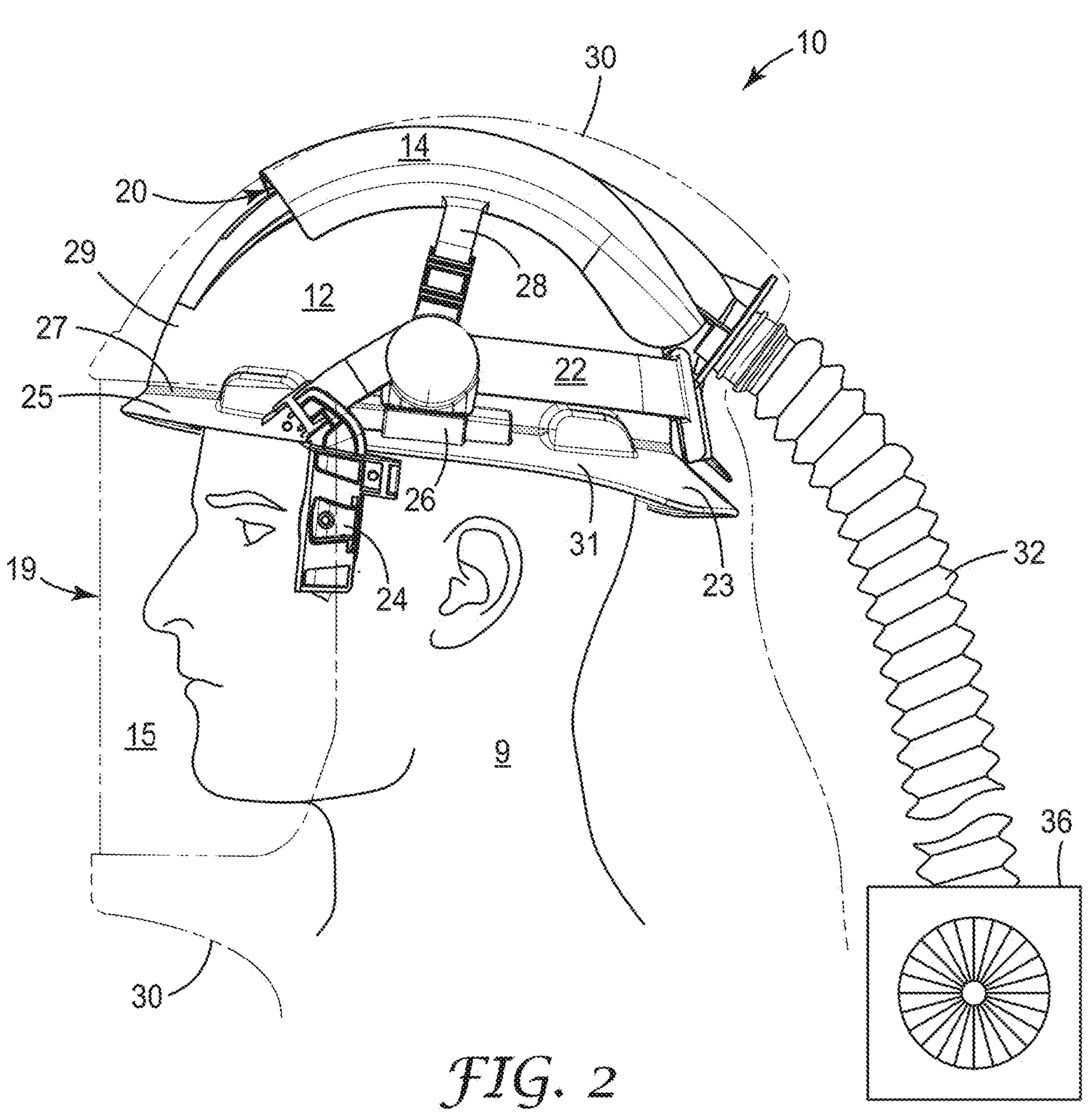
FIG. 2 is a side profile view of the respirator assembly as worn by a user.

FIG. 2 is a profile view of the respirator assembly 10 shown in FIG. 1. In addition to elements described above with regard to FIG. 1. FIG. 2 shows breathable air zone 15 proximate user 9's nose and mouth, defined by hood 30 and viewing window 19. Further details of hardhat 12 are shown, including a hard shell 29 which generally encompasses the upper portion of user 9's head. Then, extending laterally away from the shell portion 29 and around a base portion 27, is the hardhat's brim portion 31. Brim portion generally extends laterally away from the hard shell, and thus comprises a lateral dimension, as well as a vertical dimension (the vertical dimension to impart a slope to the brim). In most hardhats, the brim's lateral and vertical dimensions vary from front to back. Hardhat has at least one elongate brim portion which comprises the area of the brim with the greatest lateral dimension, that is, lateral dimension of the elongate brim portion exceeds the lateral dimension of any other area of the brim. Back brim 23 and front brim 25 are noted in the figure, with back brim 23 being the elongate brim portion because it extends laterally the furthest from base portion 27 of shell portion 29, and is more elongate than the front brim. As may be observed, user 9 is shown wearing hardhat 12 in reverse orientation, as described above, that is, the most elongate brim portion 23 is in the back, and the less elongate brim portion 25 is in the front.

Air supply 36, typically a fan and filter assembly worn on a user's belt, is shown coupled to the air inlet via air supply line 32, typically a flexible hose-type member. Commercially available PAPRs such as the TR-300, TR-600, and TR-800 include such an air supply and are sold by 3M Company (St. Paul, MN). Other suitable PAPR components known in the art may be deployed with the respiratory devices described herein.

Air supply line 32 may couple to conduit 14's coupling port 16 via hose attachment mechanism, such as a bayonet type coupling or other quick-release or non-quick release mechanisms, as noted earlier. Air supply line may be covered in a material similar to the material of the hood, or different protective covering. Conduit 14 in one embodiment has a geometric shape that follows the contour of helmet 12, bringing an air supply form the back of the hardhat toward the front, along the outer major surface of the hardhat.

Figures 3, 4:
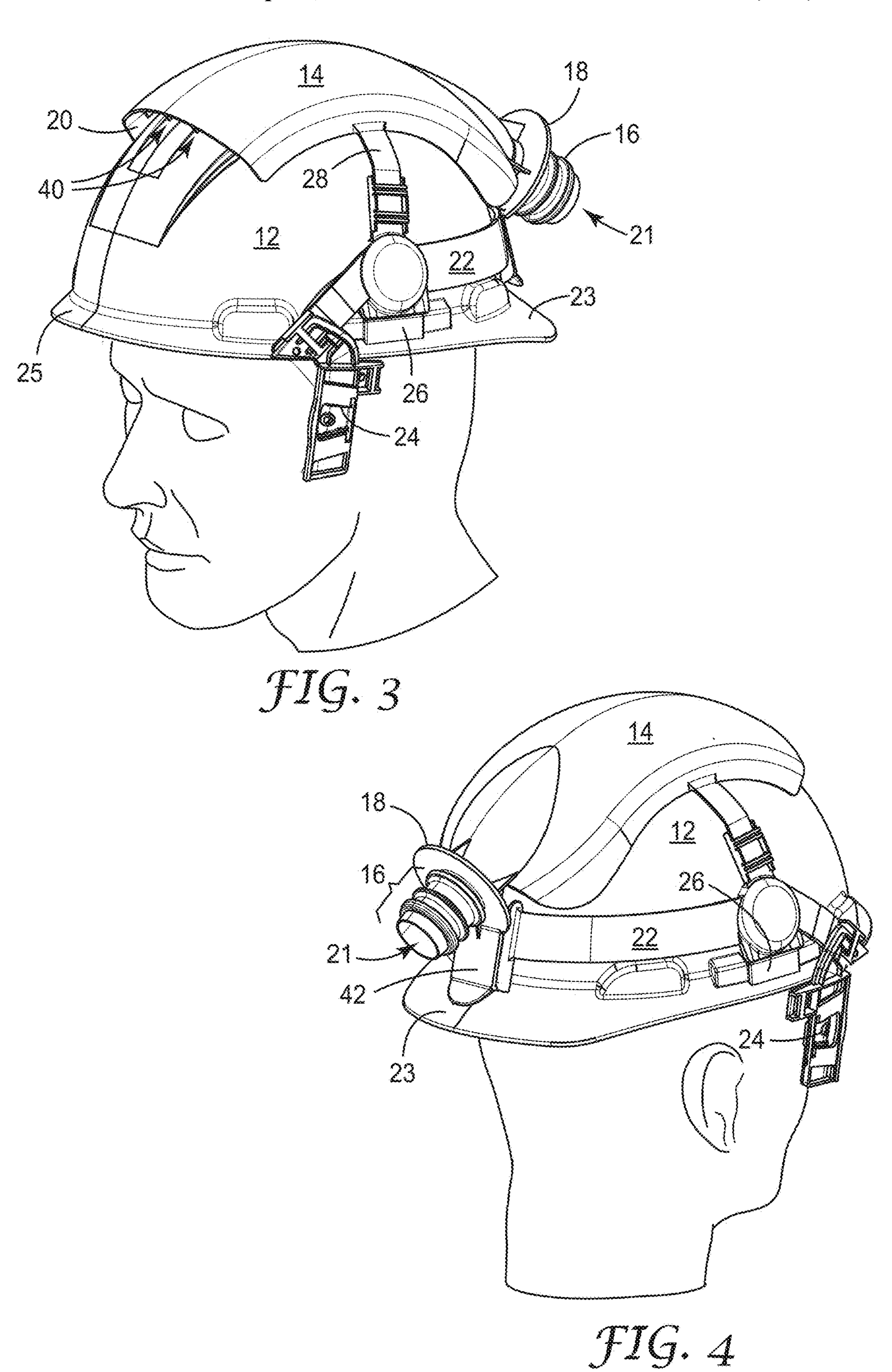
FIG. 3 is a 3D rendering of a first embodiment of a respiratory assembly.
FIG. 4 is a 3D rendering of the respiratory assembly shown in FIG. 3, from a rotated angle.

FIG. 3 and FIG. 4 show the respirator assembly shown in FIGS. 1 and 2, but without the hood, in opposed orientations. In FIG. 3, a small portion of rib structures 40 are shown on the underside of conduit 14, as further described below. In FIG. 4, adapter 22 is shown extending around from the attachment ports to the back of the helmet, where conduit 14 further couples to the adapter proximate flange 18, via back attachment point 42 by way of a ratchet tooth coupler.

Figure 5:
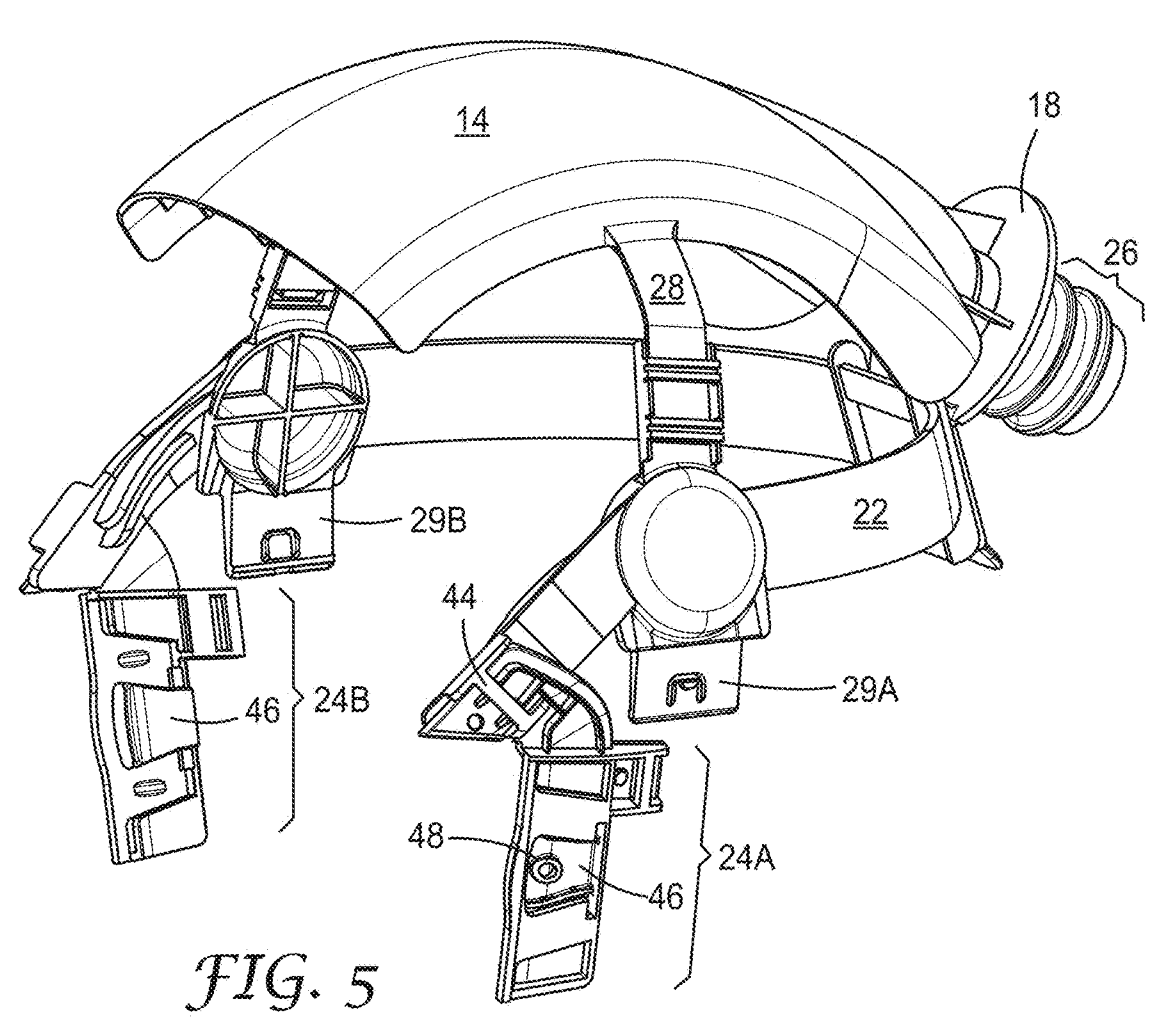
FIG. 5 shows the respiratory of FIGS. 3 and 4, but without the hardhat.
Figure 6:
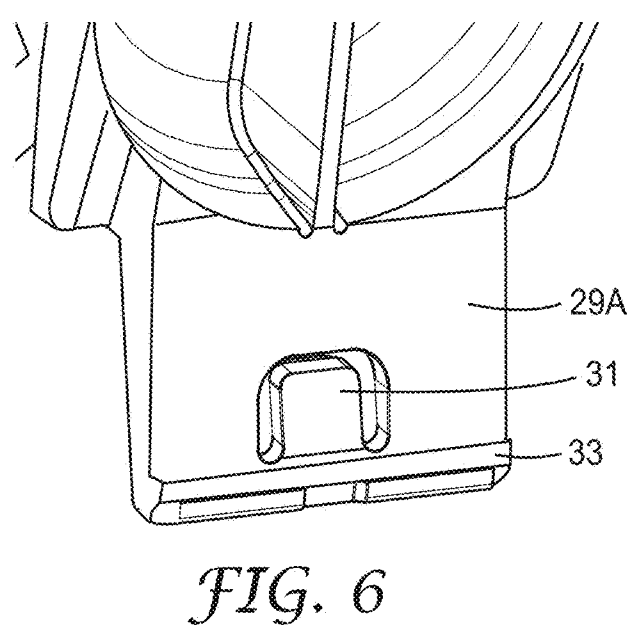
FIG. 6 is a drawing of one embodiment of an attachment tab.

FIG. 5 is a drawing of a portion of respiratory assembly as shown in the previous figures, but without the hood and without the hardhat. This drawing shows a better view of attachment clips 29A and 29B, which extend into and detachably couple to accessory ports on either side of a hardhat, as described above. A closeup of attachment clip 29B is shown in FIG. 6; biasing tab 31 extends proud of the opposite side of the major surface of attachment clip shown in the figure, pushing and holding lip 33 into a secure but releasable mechanical coupling against the edge of the bottom opening of the accessory port. A user may remove clips 29A and 29B by pushing the tab in the direction opposite the bias introduced by biasing tab 31 until the lip 33 no longer extends beyond the of the bottom opening of the accessory port and pull the adapter 22 upward and out of the accessory port. Other approaches of coupling the adapter to the hardhat are possible and are contemplated within the scope of this disclosure, including for instance snap-type features which are squeezed together to effect release, snaps, magnets, screws, etc. Non-removable fastening is also possible, such as tapes and adhesives intended to last the life of the adapter respiratory device. FIG. 5 provides a closer view of hood coupling assembly 24A and 24B. Hood coupling assembly comprises a molded member that couple to adapter 22 via a releasable snap clip; however, in some embodiments adapter 22 and hood coupling assembly may comprise a single injection molded part. A viewing window portion of hood having a securing hole is pushed into tab 46, where tab 46 biases a securing nub 48 into the securing hole of the viewing window, thus securing the hood via the viewing window, to the helmet.

Figure 7:
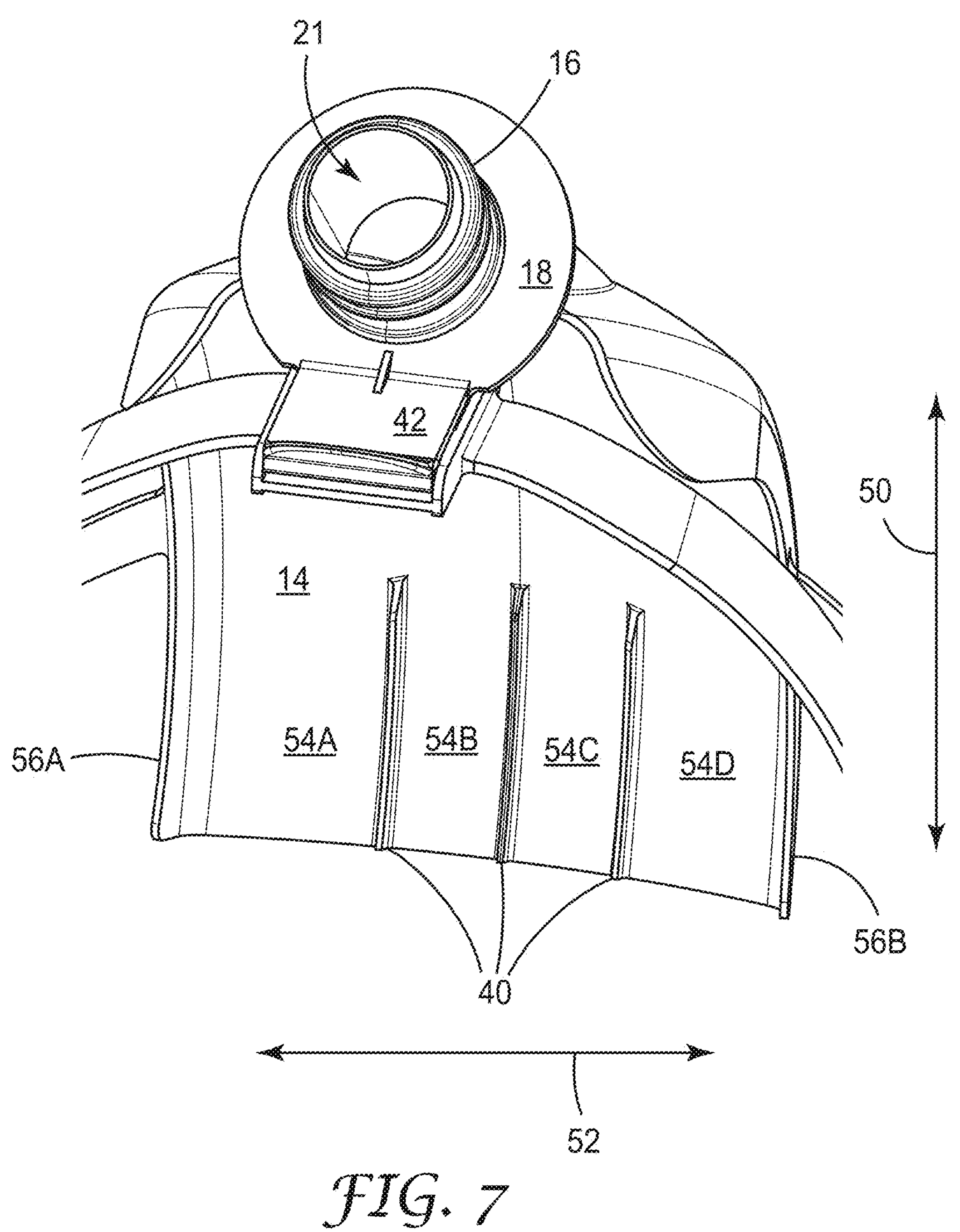
FIG. 7 is a drawing of the underside of the conduit shown in FIGS. 3, 4, and 5.

FIG. 7 is a drawing of the underside of conduit 14. Conduit 14 in the illustrated embodiment has a longitudinal dimension 50 associated with its length from a point in the middle of the back of the hardhat, to a point in the middle of the front of the hardhat, and a lateral, side-to-side dimension 52 that is the widest dimension of conduit 14 that is orthogonal to the longitudinal dimension 50. Rib structures 40, as shown in FIG. 7 and in one embodiment, are a type of support structure that are coupled to the underside of conduit 40, and have a high aspect ratio, meaning their longitudinal dimension greatly exceeds their latitudinal dimension, and they run generally parallel to the longitudinal dimension, in the direction of air flow. The three rib structures 40, in combination with side walls 56A and 56B, define an air channel comprised of air passages 54A, 54B, 54C, and 54D. The rib structures serve, in some embodiments, to increase rigidity to conduit 14, and to keep conduit 14 offset from the crown of the hardhat, to preserve an air flow channel. Other support structures may also be used to offset the top wall of conduit 14 from the exterior surface of the hardhat and provide improved structural integrity. For example, pegs, columns, upstands, posts, stakes, cylinders, or triangles could be used to similar effect as the rib structures. The side walls 56A and 56B may not form a perfect seal to the outer major surface of the hardhat, and some air may escape between the junction of the side wall and the outer major surface, but in some embodiments the seal is sufficient to allow most of, or at least a substantial portion of, the supplied air to egress out the air outlet.

Back attachment point 42 is also seen in FIG. 7, and comprises a ratchet tooth coupler.

Figures 8, 9:
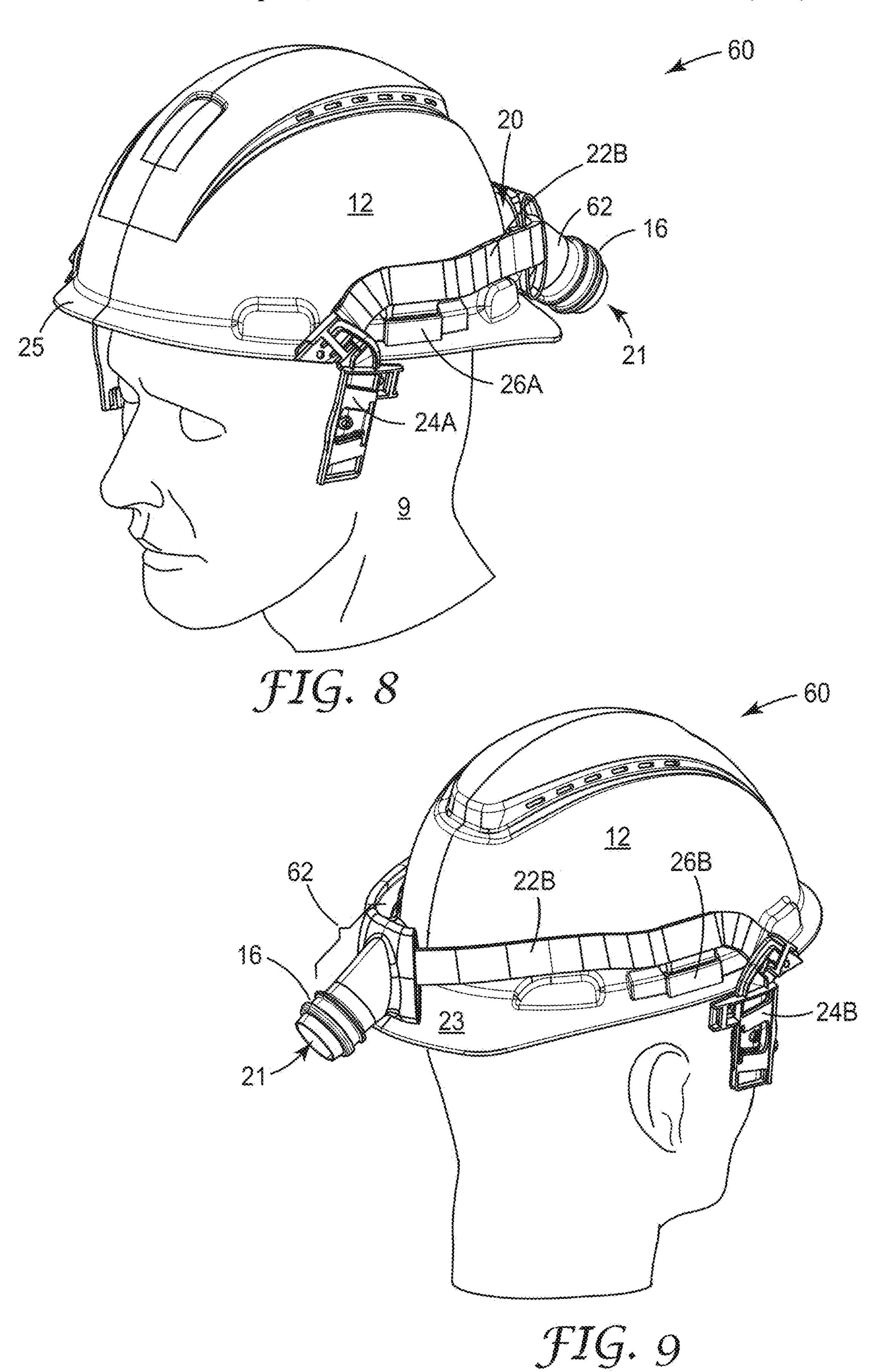
FIG. 8 is a 3D rendering of a second embodiment of a respiratory assembly.
FIG. 9 is a 3D rendering of the respiratory assembly shown in FIG. 8, from a rotated angle.

FIGS. 8 and 9 show respective front/side-oriented and back/side-oriented views of respiratory assembly 60, a different embodiment of a respiratory assembly than previously shown. FIGS. 8 and 9, as well as later figures, for simplicity, omit from the drawing a hood and its viewing window, as well as the air supply and air hose which would attach to the respiratory assembly; in practice all would be used in a full setup and would resemble that which was described above, particularly with respect to FIGS. 1 and 2. Respiratory assembly 60 includes a hardhat 12, as in earlier embodiments, with the hardhat being worn by user 9 in reverse donned orientation (back brim 23 is more elongate than front brim 25). Adapter 22B couples the hardhat via accessory ports 26A and 26B to conduit 62, which has inlet 21 and coupling port 16 for attachment to an air supply, and air outlet 20, which is held offset from the back of the helmet by adapter 22B to effect a gap, which allows fluid commutation between air inlet 21 and the back of the hardhat proximate air outlet 20. Conduit 62 in this embodiment has a hose-like, stubby shape (low aspect ratio compared with the conduit shown in embodiment shown in FIG. 1). Air supplied by an air supply via an air hose, as for example in the embodiment shown in FIG. 2, provide air to the conduit at the back of the hardhat, and direct it toward the front of the hardhat. Respiratory assembly 60, when coupled with a hood (not shown in FIGS. 8 and 9), and when provided with a source of supplied air, creates a positive pressure environment for user 9 under the hood, and air would tend to make its way from the back of the hardhat at air outlet 20 to user 9's breathable air zone.

Figures 10, 11:
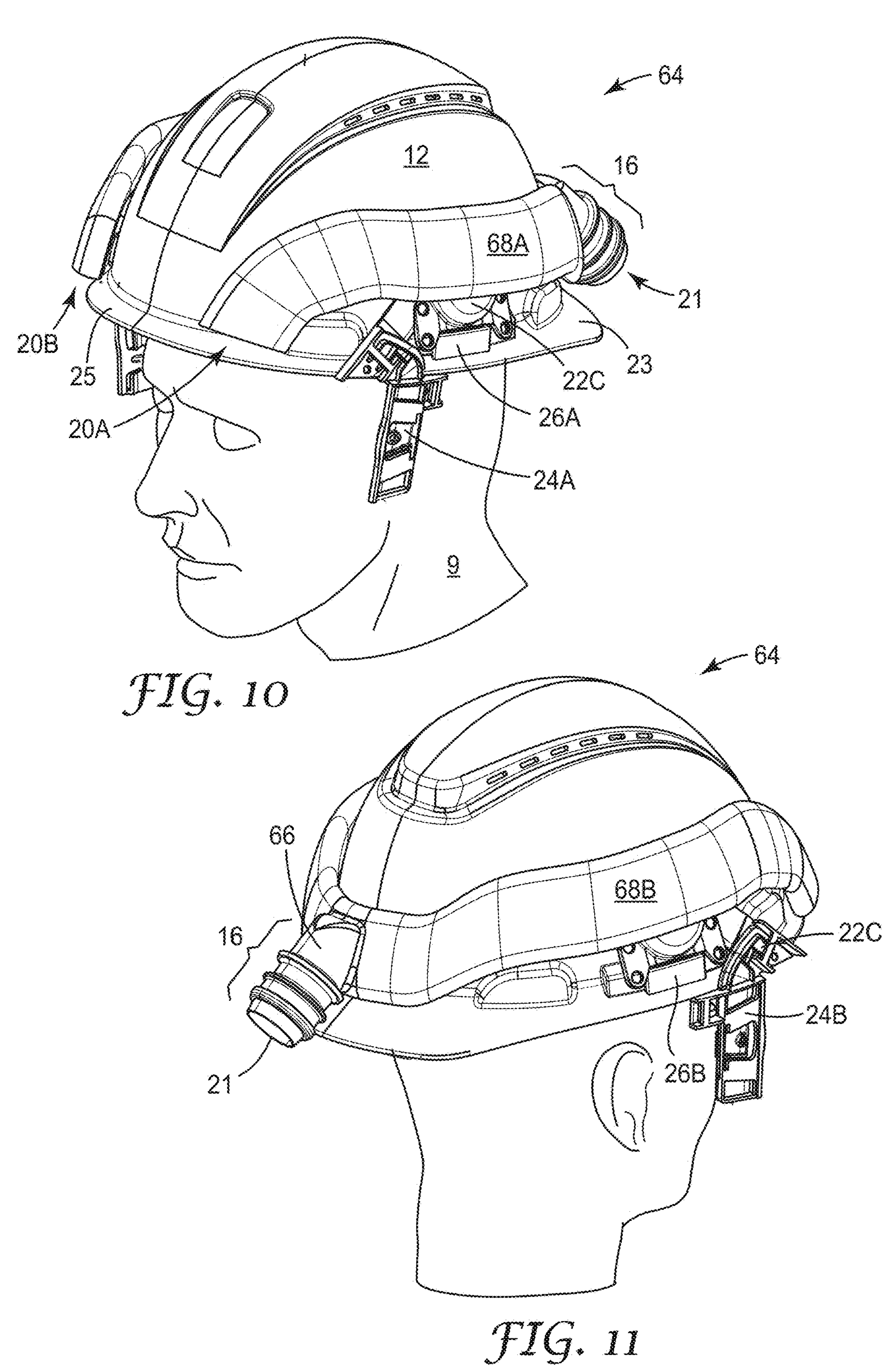
FIG. 10 is a 3D rendering of a third embodiment of a respiratory assembly.
FIG. 11 is a 3D rendering of the respiratory assembly shown in FIG. 9, from a rotated angle.

FIGS. 10 and 11 show respective front/side-oriented and back/side-oriented views of respiratory assembly 64. Respiratory assembly 64 includes hardhat 12, as in earlier embodiments, with hardhat being worn in reverse orientation, as in above-described embodiments. Air inlet 21 is at the back of user 9's head, and manifold 66 provides fluid communication between air inlet and dual a set of laterally positioned conduits 68A and 68B, which fork and branch from manifold 66 at the back of the helmet, to provide two sub-conduits that follow the contours of hardhat 12 around the helmet's sides, to provide air outlets 20A and 20B which are directed toward user 9's face (and breathable air zone as would be defined by a hood, which would be used in practice but is not shown in FIGS. 10 and 11). In the embodiments described herein, coupling port 16, manifold 66 (where present), and conduit(s) define an air channel providing fluidic communication between air inlet and air outlet. In respiratory assembly 64, the conduits are fully formed around their circumference (that is, they are self-contained, as discussed above) meaning they form all sides of the rectangular tube-like structure, in profile, of an air channel without relying on the outer major surface of the hardhat to act as a wall for the air channel (as contrasted with the embodiment described with respect to FIG. 1, and the next embodiment described with respect to FIGS. 12 and 13, for example). As compared with a couple of embodiments described below, particularly those associated with FIGS. 16-19, the individual conduit arms in respiratory assembly 64 are rectangular, as compared with circular or oval, in cross section. The lateral conduits follow the geometric shape of the outer surface of the hardhat, from manifold 66 to our outlets 20A and 20B. Coupling port 16 allows an air supply to couple to the manifold and conduits, and provide a source of breathable, filtered air to user 9. The manifold 66 and lateral air conduits 68A and 68B provide fluid communication between air inlet 21 and air outlets 20A and 20B. In the embodiments shown in FIGS. 10 and 11, the design choice of reversing the normal orientation of the hardhat may be particularly appreciated, as breathable air egressing from air outlets 20A and 20B will tend toward user 9's breathable air zone with less obstruction from front brim 25, which protrudes laterally away from user 9, than what the back brim 23 would provide if the hardhat were worn in a normal orientation. With that said, it is contemplated within the scope of some embodiments of this disclosure that the hardhat could be oriented normally, rather than in reverse orientation as shown in many or all of the embodiments herein; fluid communication performance may suffer somewhat as compared with a reverse orientation hardhat, but such performance degradation may not be material to the user, depending on the power of the air supply, operational aspects of the hood, etc.

Figures 12, 13:
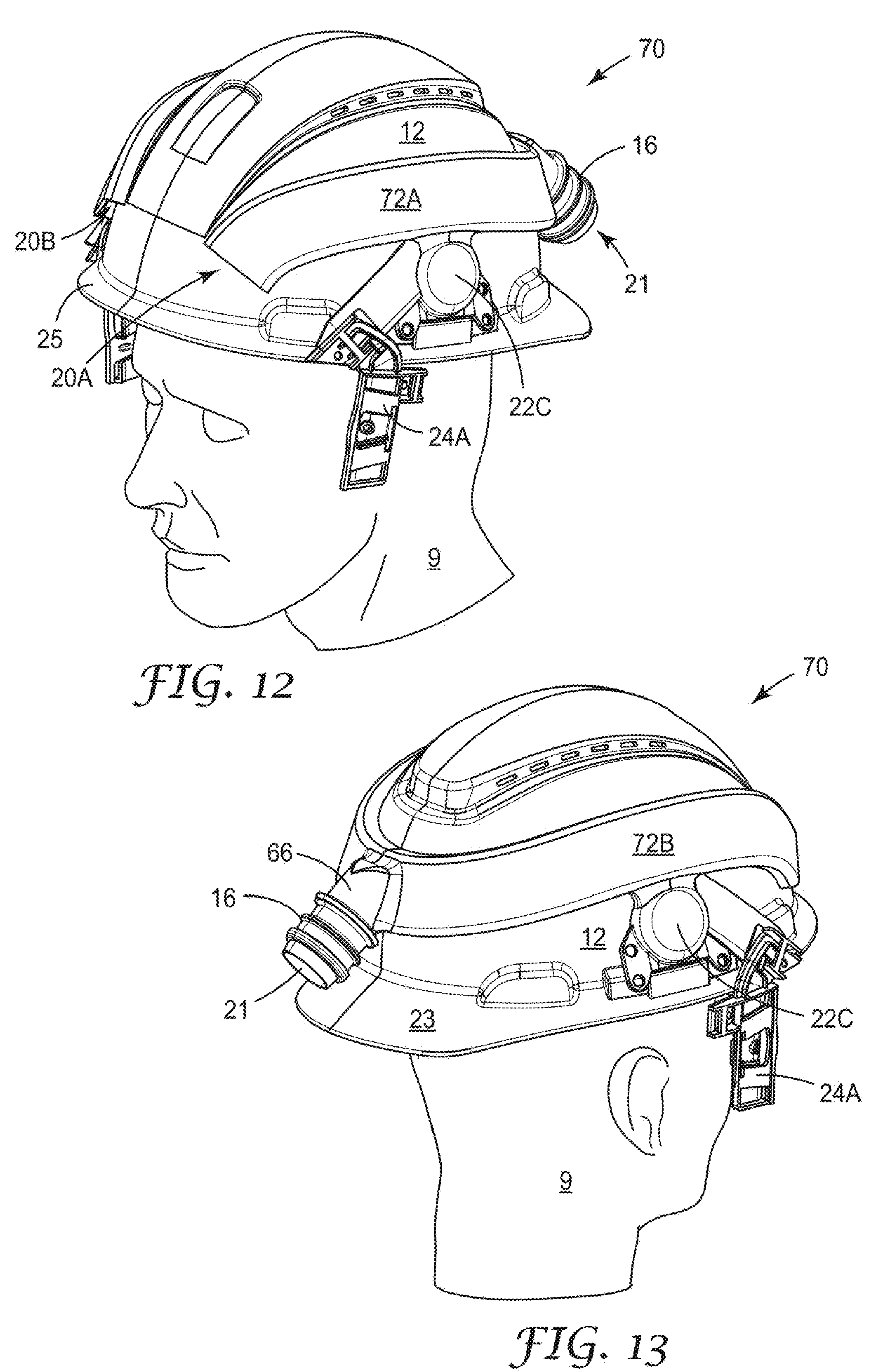
FIG. 12 is a 3D rendering of a fourth embodiment of a respiratory assembly.
FIG. 13 is a 3D rendering of the respiratory assembly shown in FIG. 12, from a rotated angle.

Turning now to FIGS. 12 and 13, a further embodiment is shown, this of respiratory assembly 70, in a front/back and rear/back orientation respectively. In this embodiment, like previous ones, air inlet 21 is in the back of the helmet, allowing incoming air from an air supply coupled via an air hose to coupling port 16, to enter manifold 66, which splits, or forks, the air supply into left and right lateral conduits (left conduit 72A, right conduit 72B), which are similar to the conduits shown in the embodiment shown in FIGS. 10 and 22, except the conduits in respiratory assembly 70 comprise three walls, and rely on hardhat 12's outer major surface to form a "4$^{th}$ wall", to complete an air channel that provides fluid communication from the back of the hardhat to the front of the hardhat. Once again, channels 72A and 72B comprise a geometric shape that follows the contours of the hardhat to deliver breathable air provided by an air supply coupled to coupling port 16 substantially following the air channels defined by conduits 72A and 72B to egress directionally toward the breathable air zone of user 9.

Figures 14, 15:
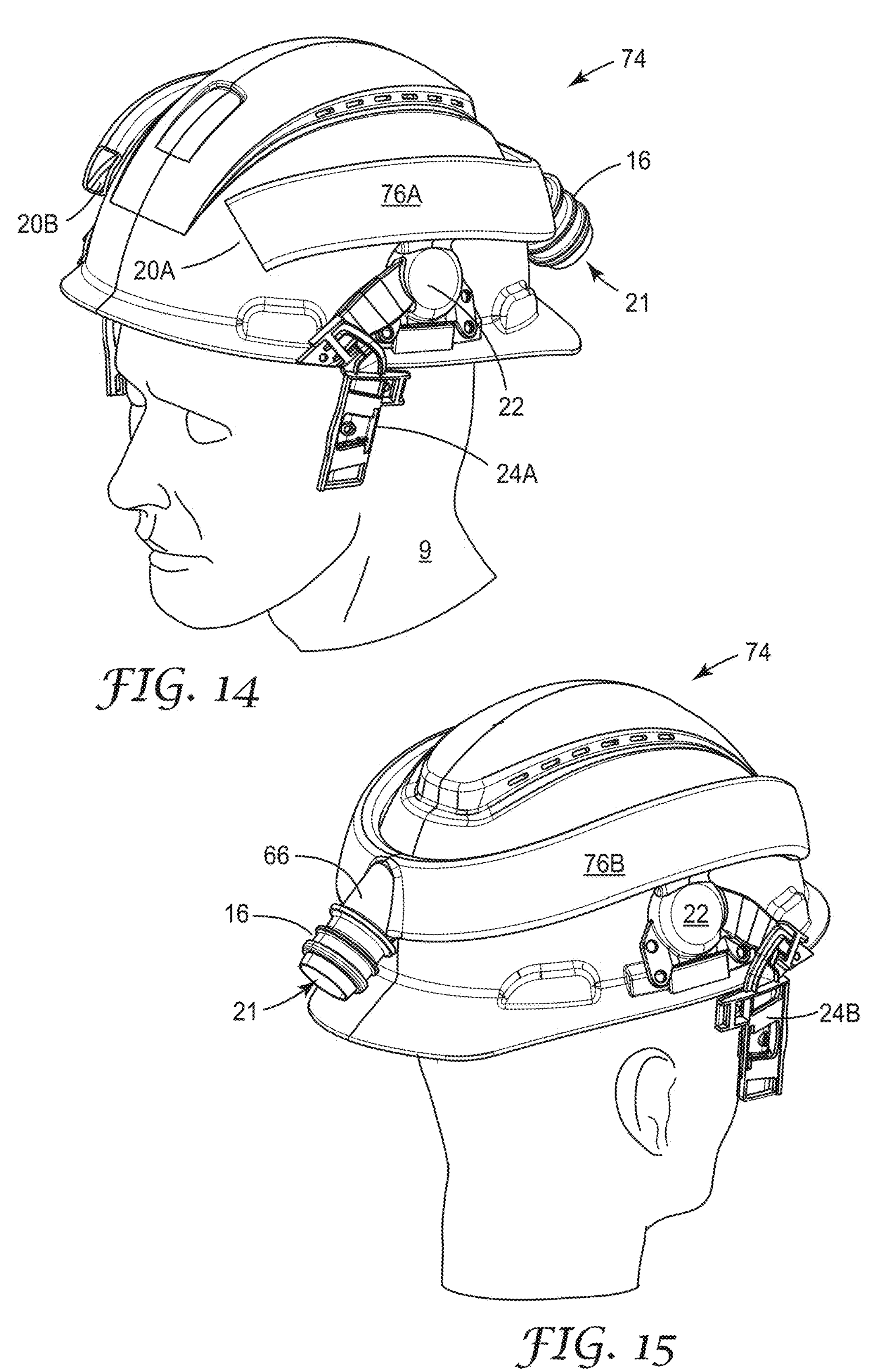
FIG. 14 is a 3D rendering of a fifth embodiment of a respiratory assembly.
FIG. 15 is a 3D rendering of the respiratory assembly shown in FIG. 14, from a rotated angle.

Respiratory assembly 74, shown in FIGS. 14 and 15, is similar to respiratory assembly 70 shown in FIGS. 12 and 13, except the lateral conduits 76A and 76B are self-contained, and do not rely on the exterior surface of the hardhat to define a wall of an air channel defined by the conduit. In some embodiments, hybrid conduits may be formed, whereby a portion of the air channel is defined by a fully formed conduit (is self-contained), and a portion of the conduit is defined by three walls of the conduit, and one wall of the conduit, defining an air channel, being the outer surface of the hardhat.

Figures 16, 17:
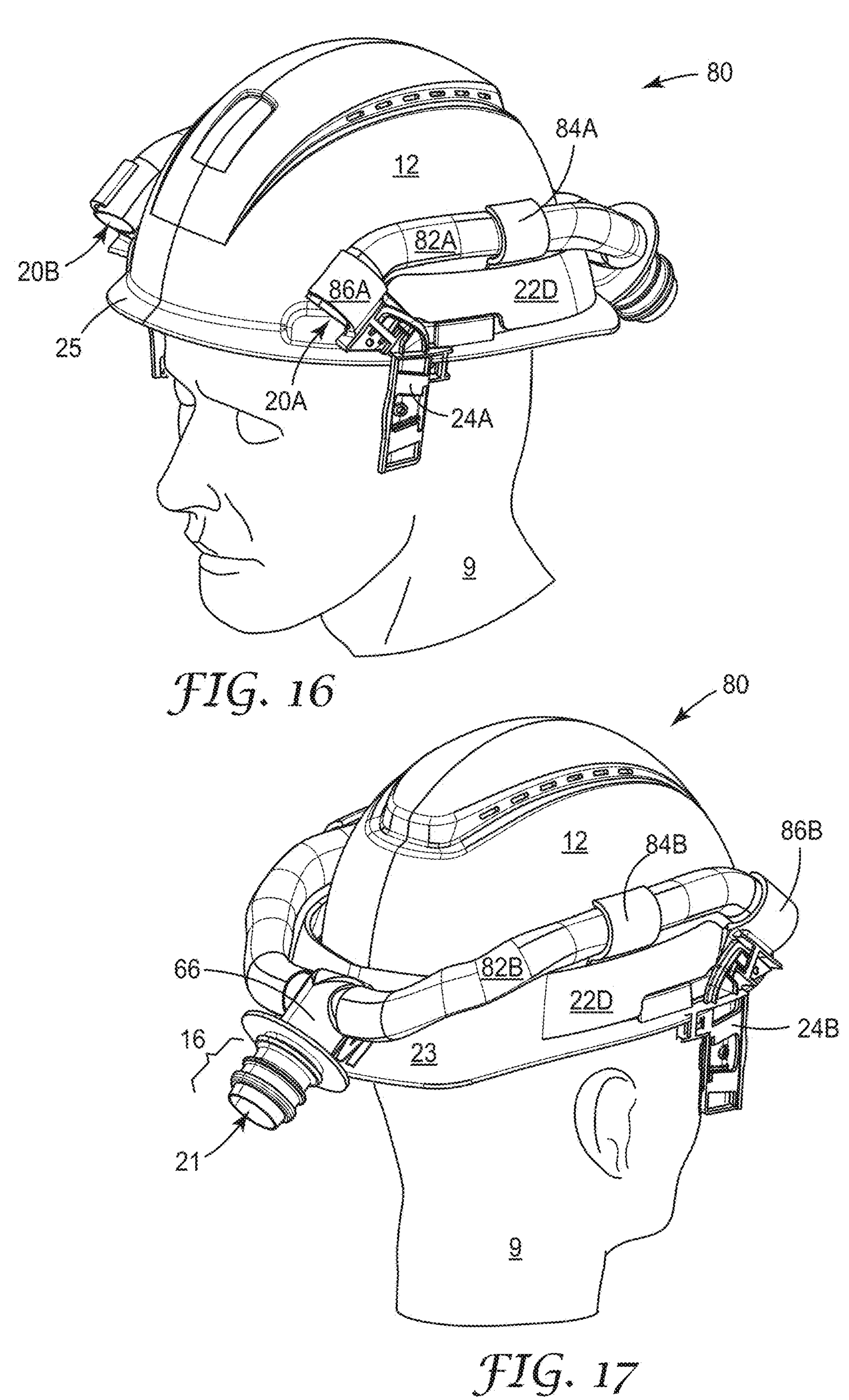
FIG. 16 is a 3D rendering of a sixth embodiment of a respiratory assembly.
FIG. 17 is a 3D rendering of the respiratory assembly shown in FIG. 16, from a rotated angle.

Turning now to FIGS. 16 and 17, a further respiratory assembly 80 is shown, this time with cylindrical tube-like conduits 82A and 82B which define an air channel with fluidic connectivity between air inlet 21 and air outlets 20A and 20B. Manifold 66 couples coupling port 16 (which would be connected to an air hose, and in turn a powered air supply in use) to a left and right lateral conduits 82A and 82B, via a fork or bifurcation. Adapter 22D couples to tube-like conduits 82A and 82B and to the accessory port of hardhat 12, via two sets of retention clips (middle retention clips 84A and 84B, and front retention clips 86A and 86B). The adapter and retention clips serve to provide the air outlets 20A and 20B directionally toward user 9's breathable air zone and face.

Figures 18, 19:
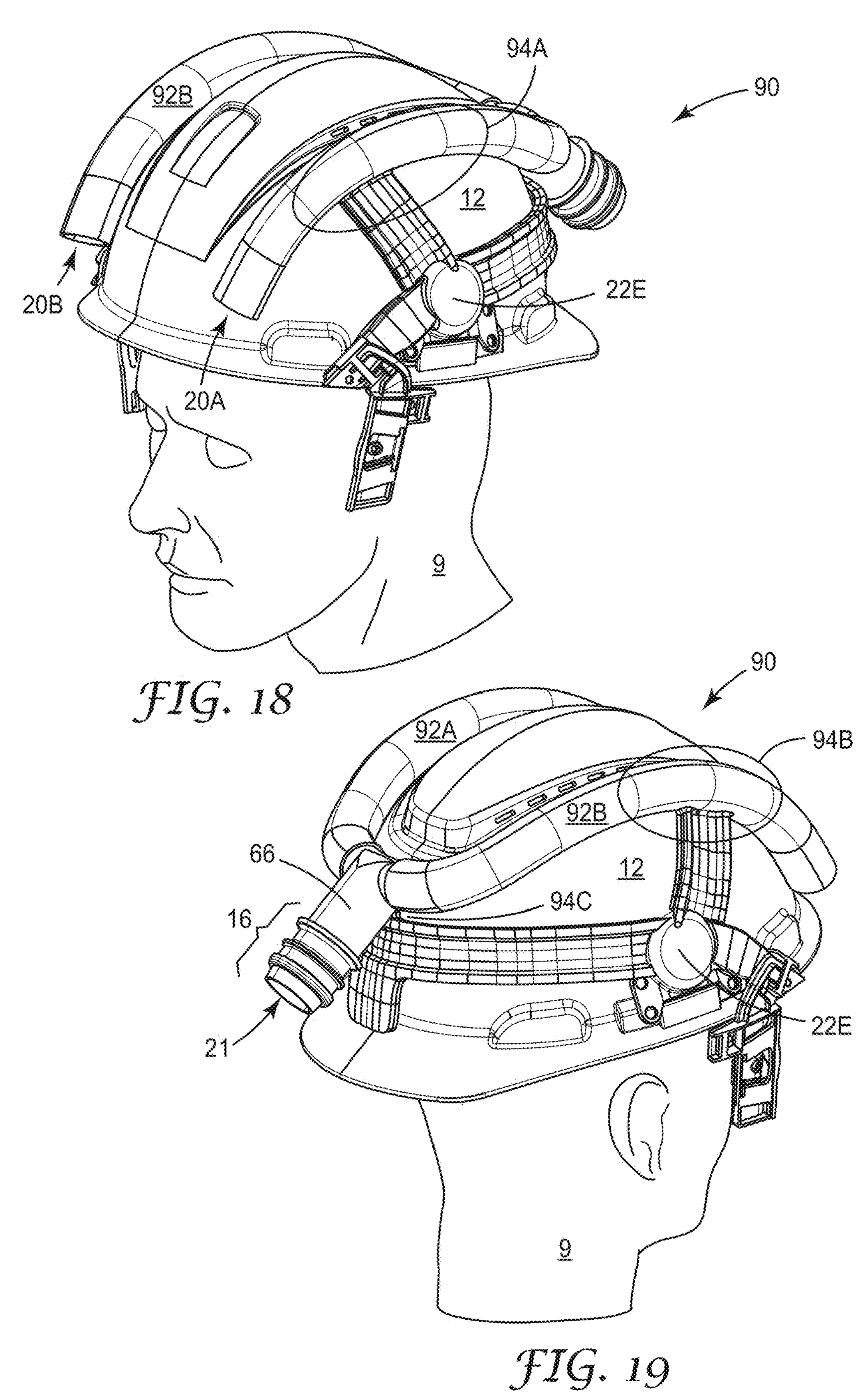
FIG. 18 is a 3D rendering of a seventh embodiment of a respiratory assembly.
FIG. 19 is a 3D rendering of the respiratory assembly shown in FIG. 17, from a rotated angle.

In FIGS. 18 and 19, a respiratory assembly 90 similar to that shown in FIGS. 16 and 17 is shown. Tube-like conduits 92A and 92B are positioned laterally, but higher on the hardhat, following the contours of the exterior surface of the hardhat. Manifold 66 couples air inlet 21 to the tube-like conduits 92A and 92B, which provide air outlets 20A and 20B toward a breathable air zone of user 9. Rather than retention clips, as were shown in respiratory assembly 80, in this embodiment the adapter 22E is permanently coupled to the tube-like conduits, either as part of a molding process or by adhesive means, at attachment points 94A, 94B, and 94C (which is located at the rear of the hardhat and couples to manifold 66. A clip approach as in respiratory assembly 80 could also be used.

In the present detailed description of the preferred embodiments, reference is made to the accompanying drawings, which illustrate specific embodiments in which the invention may be practiced. The illustrated embodiments are not intended to be exhaustive of all embodiments according to the invention. It is to be understood that other embodiments may be utilized, and structural or logical changes may be made without departing from the scope of the present invention. The following detailed description, therefore, is not to be taken in a limiting sense, and the scope of the present invention is defined by the appended claims.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "proximate," "distal," "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below, or beneath other elements would then be above or on top of those other elements.

As used herein, when an element, component, or layer for example is described as forming a "coincident interface" with, or being "on," "connected to," "coupled with," "stacked on" or "in contact with" another element, component, or layer, it can be directly on, directly connected to, directly coupled with, directly stacked on, in direct contact with, or intervening elements, components or layers may be on, connected, coupled or in contact with the particular element, component, or layer, for example. When an element, component, or layer for example is referred to as being "directly on," "directly connected to," "directly coupled with," or "directly in contact with" another element, there are no intervening elements, components or layers for example.

What is claimed is:

1. A respirator assembly comprising:

a hardhat designed to provide impact protection for a user's head, the hardhat having an outer major surface having a geometric shape;

a hood enveloping the respirator assembly to define a breathable air zone for the user, the hood comprising:

a face piece that covers at least a face and the head of a user but does not provide impact protection;

a viewing window made of a light transmissive material; and an aperture which allows an air inlet to extend outside of the hood and couple to an air supply line;

wherein an air conduit is detachably coupled to the outer major surface of the hardhat, the air conduit having a shape that follows the geometric shape of at least part of the outer major surface of the hardhat and comprising a conduit wall that defines an air channel in conjunction with a portion of the outer major surface of the hardhat, wherein the air channel is configured to provide air from the air inlet to an air outlet directionally toward the breathable air zone proximate a user's face when the air inlet is coupled to the air supply line, resulting in a positive air pressure environment in the user's breathable air zone.

2. The respirator assembly of claim 1, further comprising an adapter which is removably coupled to the hardhat through a hardhat accessory port, wherein a hood coupling assembly and the air conduit detachably couple to the adapter.

3. The respirator assembly of claim 2, wherein the air inlet comprises an attachment mechanism, for attachment to the air supply line.

4. The respirator assembly of claim 3 wherein the hardhat has a front, corresponding to the portion of the hardhat proximate the user's forehead when the hardhat is donned by the user, and a back, corresponding to the portion of the hardhat proximate the back of the user's head when donned by the user, and wherein the attachment mechanism is proximate the back of the hardhat.

5. The respirator assembly of claim 4, wherein the air outlet is positioned closer to the front area than the back area.

6. The respirator assembly of claim 4, wherein the air conduit comprises a plurality of air sub-conduits.

7. The respirator assembly of claim 1, wherein the hardhat meets at least one of the following regulatory standards: EN 397:2012+A1, ANSI/ISEA Z89.1-2014, Z94.1-15, or UNE-EN 12941.

8. The respirator assembly of claim 7, further comprising an adaptor that mechanically couples the air conduit to the hardhat.

9. The respirator assembly of claim 7, wherein the hardhat further comprises a plurality of accessory ports, and wherein the adaptor couples to the hardhat via at least one of the plurality of accessory ports.

10. The respirator assembly of claim 1, wherein the air conduit has a geometric shape that is contoured to substantially follow the shape of the outer major surface of the hardhat.

11. The respirator assembly of claim 7, further comprising:

a powered air supply coupled to the air inlet, wherein the powered air supply provides the source of supplied air to the inlet of the air conduit, and a substantial portion of the supplied air flows out of the outlet of the air conduit.

12. The respirator assembly of claim 1, wherein the hardhat has a crown portion, and the air conduit is positioned proximate the crown portion.

13. The respirator assembly of claim 4, wherein the air conduit provides an air channel from an area proximate the back of the hardhat toward the front of the hardhat.

14. The respirator assembly of claim 1, wherein the air conduit includes internal rib structures that define, at least partially, a plurality of air channels.

15. The respirator assembly of claim 12, wherein the air conduit provides fluid communication between the air inlet and the air outlet.

16. The respirator assembly of claim 4, wherein the air conduit is injection molded.

17. The respirator assembly of claim 4, wherein the air conduit comprises a thermoplastic material.

18. The respirator assembly of claim 1, further comprising a manifold, wherein the air conduit comprises a dual set of laterally positioned air conduits which fork and branch from the manifold at the back of the hardhat to follow the geometric shape of the outer major surface to provide air outlets; wherein the manifold provides fluid communication between the air inlet and the air conduits.

* * * * *